US012614024B2

(12) United States Patent
Kumar et al.

(10) Patent No.: US 12,614,024 B2
(45) Date of Patent: Apr. 28, 2026

(54) SYSTEM AND METHOD FOR EXTRACTING STRUCTURED DATA

(71) Applicant: Target Brands, Inc., Minneapolis, MN (US)

(72) Inventors: Sharath Kumar, Karnataka (IN); Sajin Raveendran, Karnataka (IN); Srividhya Radhakrishna, Karnataka (IN); Ankit Agarwal, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/159,428

(22) Filed: Jan. 25, 2023

(65) Prior Publication Data

US 2024/0249071 A1      Jul. 25, 2024

(51) Int. Cl.
*G06F 40/189* (2020.01)
*G06F 16/22* (2019.01)
(Continued)

(52) U.S. Cl.
CPC ........ *G06F 40/189* (2020.01); *G06F 16/2291* (2019.01); *G06F 16/258* (2019.01); *G06F 16/285* (2019.01)

(58) Field of Classification Search
CPC .. G06F 40/189; G06F 16/2291; G06F 16/258; G06F 16/285
(Continued)

(56) References Cited

U.S. PATENT DOCUMENTS

| | | | |
|---|---|---|---|
| 8,090,678 B1 * | 1/2012 | Glickman | G06F 16/35 |
| | | | 707/602 |
| 8,515,208 B2 | 8/2013 | Minerich | |

(Continued)

FOREIGN PATENT DOCUMENTS

| | | | | |
|---|---|---|---|---|
| CN | 106650718 A * | 5/2017 | | G06V 10/225 |
| CN | 110751218 A * | 2/2020 | | G06K 9/4604 |

(Continued)

OTHER PUBLICATIONS

Kochi et al., "User-defined Template for Identifying Document Type and Extracting Information from Documents", in Proceedings of the Fifth International Conference on Document Analysis and Recognition (ICDAR '99), Bangalore, India, 1999, pp. 127-130. (Year: 1999).*

(Continued)

*Primary Examiner* — Phuong Thao Cao
(74) *Attorney, Agent, or Firm* — Merchant and Gould, PC

(57) ABSTRACT

The present application describes methods and systems which may automatically extract structured data. One method includes receiving a structured data file in a first data file structure; generating a visual representation of the structured data file; extracting a featureset including a plurality of features from the visual representation via an image classification model; comparing the featureset of the visual representation to one or more featuresets associated with other structured data files; based on a determination that the featureset is within a predetermined threshold distance from an identified featureset from among the one or more featuresets, selecting a template associated with identified featureset, the template including a definition of at least one key and at least one position; using the selected template to identify key-value pairs within the structured data file; and (Continued)

automatically generating an output file in a common data file structure from information in the structured data file.

18 Claims, 12 Drawing Sheets

(51) Int. Cl.
*G06F 16/25* (2019.01)
*G06F 16/28* (2019.01)

(58) Field of Classification Search
USPC ........................................................ 707/736
See application file for complete search history.

(56) References Cited

U.S. PATENT DOCUMENTS

| | | | |
|---|---|---|---|
| 9,280,525 B2 | 3/2016 | Olszewski et al. | |
| 9,754,187 B2 * | 9/2017 | Panferov .............. | G06V 30/418 |
| 9,792,289 B2 * | 10/2017 | Reininger ............ | G06T 11/206 |
| 9,824,270 B1 * | 11/2017 | Mao ..................... | G06V 30/416 |
| 10,289,959 B2 | 5/2019 | Kakhandiki et al. | |
| 10,354,225 B2 | 7/2019 | Sharma et al. | |
| 10,654,166 B1 | 5/2020 | Hall | |
| 10,853,638 B2 * | 12/2020 | Mukhopadhyay .... | G06F 40/174 |
| 10,860,905 B1 | 12/2020 | Gligan et al. | |
| 10,885,423 B1 | 1/2021 | Voicu et al. | |
| 11,256,760 B1 * | 2/2022 | Corcoran ............... | G06F 16/51 |
| 11,763,075 B1 * | 9/2023 | Sarrafzadeh ........... | G06F 40/12 |
| | | | 715/235 |
| 2005/0192983 A1 * | 9/2005 | Hattori .................... | G06F 16/83 |
| | | | 707/E17.127 |
| 2005/0289182 A1 * | 12/2005 | Pandian ................. | G06Q 10/10 |
| 2016/0371246 A1 * | 12/2016 | Deepak ................. | G06V 10/22 |
| 2017/0372439 A1 * | 12/2017 | Smith .................. | G06V 30/416 |
| 2018/0060760 A1 | 3/2018 | Permeh et al. | |
| 2018/0144042 A1 * | 5/2018 | Sheng ................... | G06Q 10/10 |
| 2018/0189615 A1 * | 7/2018 | Kang ...................... | G06N 3/08 |
| 2019/0303447 A1 * | 10/2019 | Mohiuddin Khan ....................... | |
| | | | G06V 30/412 |
| 2020/0073878 A1 * | 3/2020 | Mukhopadhyay ... | G06V 30/412 |
| 2020/0074169 A1 * | 3/2020 | Mukhopadhyay ...... | G06F 18/22 |
| 2020/0104587 A1 * | 4/2020 | Bhatnagar .............. | G06V 30/40 |
| 2020/0110800 A1 * | 4/2020 | Astigarraga .......... | G06F 40/289 |
| 2020/0134374 A1 | 4/2020 | Oros | |
| 2020/0242950 A1 * | 7/2020 | Guo ........................ | G01S 19/42 |
| 2021/0012102 A1 * | 1/2021 | Cristescu .............. | G06F 40/284 |
| 2021/0019157 A1 | 1/2021 | Voicu | |
| 2021/0019360 A1 * | 1/2021 | Li .......................... | G06F 40/169 |
| 2021/0019574 A1 | 1/2021 | Voicu | |
| 2021/0110527 A1 * | 4/2021 | Wheaton .............. | G06T 7/0002 |
| 2021/0334664 A1 * | 10/2021 | Li ........................ | G06V 30/413 |
| 2022/0036063 A1 * | 2/2022 | Bhuyan ............... | G06V 30/416 |
| 2022/0044048 A1 * | 2/2022 | Phatak ................. | G06V 10/443 |
| 2022/0067363 A1 * | 3/2022 | Skoryukina ......... | G06V 10/758 |
| 2022/0207268 A1 * | 6/2022 | Gligan ................. | G06F 40/137 |
| 2022/0229863 A1 * | 7/2022 | Schwarz ................ | G06F 40/30 |
| 2022/0284215 A1 * | 9/2022 | Rastogi .............. | G06F 16/9024 |
| 2022/0309277 A1 * | 9/2022 | Shu ......................... | G06F 16/35 |
| 2022/0392047 A1 * | 12/2022 | Wheaton ................ | G06V 10/40 |
| 2025/0308277 A1 * | 10/2025 | Tata ........................ | G06F 18/22 |

FOREIGN PATENT DOCUMENTS

| | | | | |
|---|---|---|---|---|
| CN | 112733658 A | * | 4/2021 | ........... G06F 16/113 |
| CN | 114579708 A | * | 6/2022 | |
| CN | 115063630 A | * | 9/2022 | |
| CN | 115512376 A | * | 12/2022 | ............ G06F 16/35 |
| EP | 1052593 A2 | * | 11/2000 | .......... G06V 30/414 |
| EP | 3796187 A1 | * | 3/2021 | ............ G06F 16/93 |
| EP | 3955130 A1 | * | 2/2022 | .......... G06F 16/355 |
| JP | 2004302683 A | * | 10/2004 | |

OTHER PUBLICATIONS

Sing, Tarun; Combining Rule-Based and Model-Based Approaches for Improved Document Processing (UIPath); Feb. 12, 2020; 8 Pages.

Sembai, Sophia; Introducing UIPath Document Understanding—A More Efficient Way to Intelligently Process Documents (UIPath); May 13, 2020; 10 Pages.

* cited by examiner

First Structured Data File 11d

| Item | Price | Cost |
|---|---|---|
| Item 1 | 19 | 17 |
| Item 2 | 21 | 11 |
| Item 3 | 34 | 29 |
| Item 4 | 17 | 10 |
| Item 5 | 24 | 17 |
| Item 6 | 20 | 15 |
| Table 1 | Table 2 | |

First Structured
Data File(s)
11d

Second Structured Data File 11e

| Price | Item | Cost |
|---|---|---|
| 45 | Item 1 | 26 |
| 36 | Item 2 | 15 |
| 72 | Item 3 | 42 |
| 35 | Item 4 | 10 |
| 66 | Item 5 | 49 |
| 12 | Item 6 | 6 |
| Table 1 | Table 2 | |

Second Structured
Data File(s)
11e

800

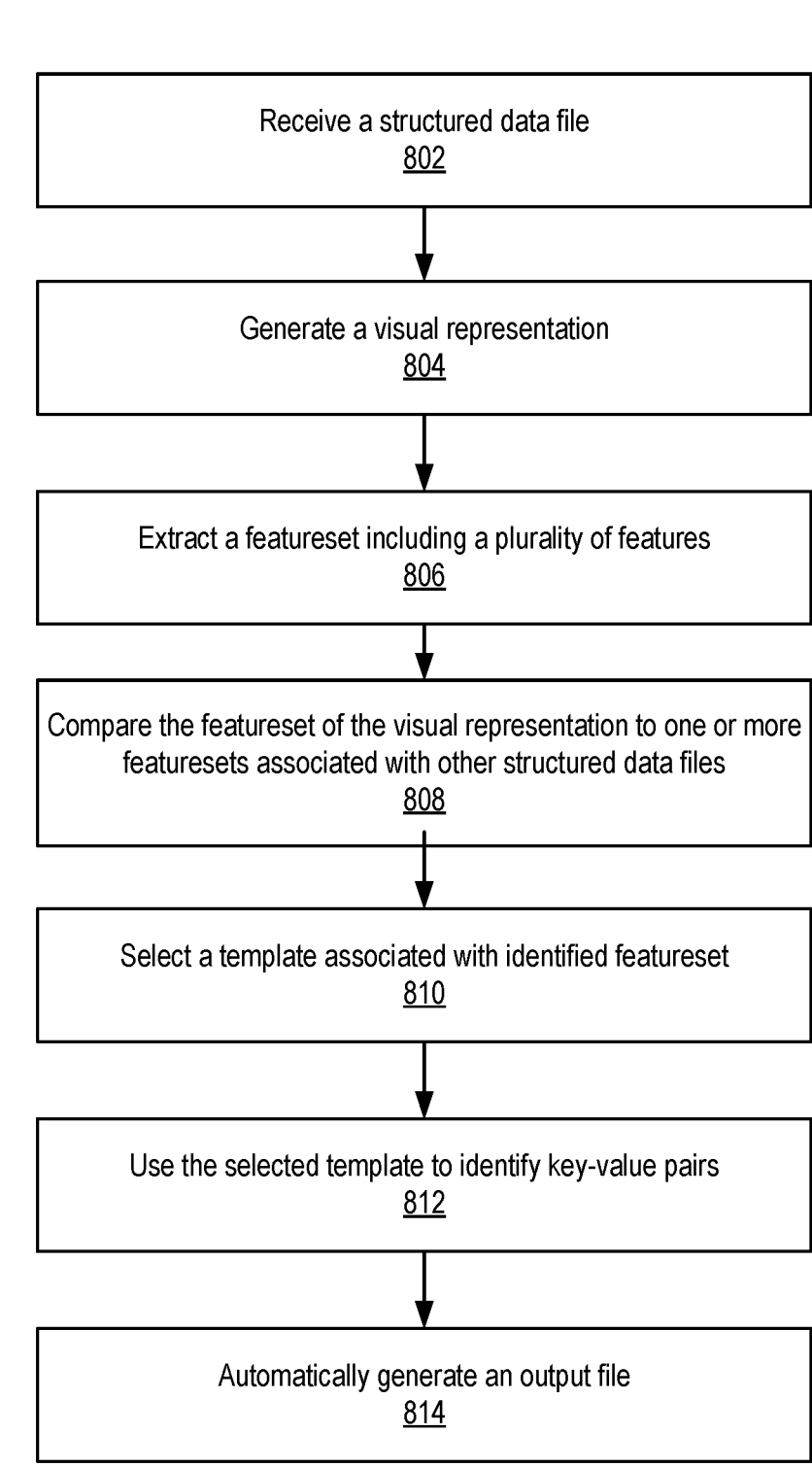

Receive a structured data file
802

Generate a visual representation
804

Extract a featureset including a plurality of features
806

Compare the featureset of the visual representation to one or more featuresets associated with other structured data files
808

Select a template associated with identified featureset
810

Use the selected template to identify key-value pairs
812

Automatically generate an output file
814

*FIG. 8*

SYSTEM AND METHOD FOR EXTRACTING STRUCTURED DATA

BACKGROUND

An organization may utilize electronic files to analyze information pertinent to its operation. In some circumstances, the data is structured to facilitate processing, e.g., text stored in a recognized data structure, such as data organized in columns and rows for transactional system data or Microsoft Excel files. The data in a file may be modified by multiple individuals across the organization or by multiple outside business partners, thus different versions, formats, and layouts of files are created. In addition, users of such files may adjust the data to different positions in the file. This may be the case where an organization works with third-party organizations to exchange data, for example, in the form of invoices, purchase orders, or other form-based data that is relevant to business operations. Such documents may be received from vendors or customers, who may each adopt their own data formats or layouts.

When a document recipient within the organization wishes to extract desired information, those individuals must typically manually inspect the relevant files received from third parties (either internal to or external to the organization), that recipient typically has to locate the relevant data in relevant files. For example, information regarding product identities, prices, quantities, dates, tracking numbers, and the like, may be located in different arrangements, at different locations, and in different data formats across different files made by others. This manual inspection to identify relevant information is inefficient. In particular, in large-scale organizations that work with a large number of outside suppliers and customers, requiring manual inspection of individual operational documents may be time and cost prohibitive.

SUMMARY

In a first aspect, a method for extracting structured data from a structured data file is disclosed. The method includes receiving, at an organization, a structured data file in a first data file structure; generating a visual representation of the structured data file; extracting a featureset including a plurality of features from the visual representation via an image classification model; comparing the featureset of the visual representation to one or more featuresets associated with other structured data files based, at least in part, on a cosine distance between the featureset and each of the one or more featuresets; based on a determination that the featureset is within a predetermined threshold distance from an identified featureset from among the one or more featuresets, selecting a template associated with identified featureset, the template including a definition of at least one key and at least one position; using the selected template to identify key-value pairs within the structured data file; and automatically generating an output file in a common data file structure from information in the structured data file based, at least in part, on positions of the key-value pairs within the structured data file, the common data file structure being different from the first data file structure.

In some embodiments, the method further includes receiving, at an application plugin, a definition of one or more field labels and values; generating, from the one or more field labels and values, one or more key-value pairs associated with positions within the structured data file; adding the one or more key-value pairs to the key-value pairs associated with the structured data file; updating the selected template based, at least in part, on the one or more added key-value pairs.

In some embodiments, the method further includes receiving, at the organization, a second structured data file in a second data file structure; generating a second visual representation of the second structured data file; extracting a second featureset including a plurality of features from the second visual representation via the image classification model; comparing the second featureset of the second visual representation to one or more featuresets associated with other structured data files based, at least in part, on a cosine distance between the second featureset and each of the one or more featuresets; based on a determination that the second featureset is outside of the predetermined threshold distance from any of the one or more featuresets, prompting a user, via an application plugin, to define one or more field labels and values associated with the second structured data file; generating, from the one or more field labels and values associated with the second structured data file, one or more key-value pairs associated with positions within the second structured data file; creating a second template based, at least in part, on keys and associated positions from among the one or more key-value pairs associated with the second structured data file.

In some embodiments, the method further includes automatically generating a second output file in the common data file structure from information in the second structured data file based, at least in part, on positions of the key-value pairs within the second structured data file, the common data file structure being different from the second data file structure.

In some embodiments, the method further includes adding the second structured image to a new cluster within a plurality of clusters of images, each cluster of images being associated with a different template.

In some embodiments, the method further includes based on the determination that the featureset is within a predetermined threshold distance from an identified featureset from among the one or more featuresets, automatically prompting a user within an application plugin to select the template.

In some embodiments, the visual representation of the structured data file is generated in an image file format selected from among: a JPEG image format; a PNG image format; a BMP image format; a GIF image format; and a TIFF image format.

In some embodiments, the method further includes based on the determination that the featureset is within a predetermined threshold distance from an identified featureset from among the one or more featuresets, adding the structured data file to a cluster of structured data files associated with the template.

In some embodiments, the method further includes prior to receiving the structured data file: clustering the other structured data files based on visual similarity; and associating templates with each corresponding cluster of structured data files.

In some embodiments, clustering the other structured data files includes performing a k-means clustering of the other structured data files based, at least in part, on cosine distance calculations between pairs of featuresets from among the one or more featuresets.

In some embodiments, the image classification model comprises a pretrained image classification model.

In a second aspect, a computing system is disclosed. The computing system includes a server system including a processor and a memory coupled to the processor, the memory stores instructions. When the instructions are executed by the processor, perform a set of operations. In examples, the set of operations includes receiving, at an organization, a first structured data file in a first data file structure; generating a visual representation of the first structured data file; extracting a featureset including a plurality of features from the visual representation via an image classification model; comparing the featureset of the visual representation to one or more featuresets associated with other structured data files based, at least in part, on a cosine distance between the featureset and each of the one or more featuresets; based on a determination that the featureset is within a predetermined threshold distance from an identified featureset from among the one or more featuresets, selecting a template associated with identified featureset, the template including a definition of at least one key and at least one position; using the selected template to identify key-value pairs within the first structured data file; and automatically generating an output file in a common data file structure from information in the first structured data file based, at least in part, on positions of the key-value pairs within the first structured data file, the common data file structure being different from the first data file structure.

In some embodiments, the system further includes an application plugin installable at a user device, the application plugin being communicatively connected to the server system via an Application Programming Interface (API).

In some embodiments, the application plugin includes a user interface accessible from the user device, the user interface being configured to define one or more field labels and values associated with the structured data file.

In some embodiments, the user interface includes a plurality of user-selectable interface elements including at least one of the following: a fields tab and a tables tab.

In some embodiments, the user interface is configured to display the selected template.

In some embodiments, the system further includes a database for storing at least one of the featureset including a plurality of features, the structured data file, and the output file, the database being communicatively connected to the server system.

In some embodiments, the system further includes a storage for storing cluster information, the database being communicatively connected to the server system.

In a third aspect, a computer-readable storage medium is disclosed. The computer-readable storage medium includes computer-executable instructions which, when executed, cause a computing system to perform a set of operations. The set of operations includes receiving, at an organization, a first structured data file in a first data file structure; generating a visual representation of the first structured data file; extracting a featureset including a plurality of features from the visual representation via an image classification model; comparing the featureset of the visual representation to one or more featuresets associated with other structured data files based, at least in part, on a cosine distance between the featureset and each of the one or more featuresets; the set of operations further includes based on a determination that the featureset is outside of a predetermined threshold distance from any of the one or more featuresets: prompting a user, via an application plugin, to define one or more field labels and values associated with the structured data file; generating, from the one or more field labels and values associated with the structured data file, one or more key-value pairs associated with positions within the structured data file; creating a template based, at least in part, on the one or more key-value pairs associated with positions within the second structured data file; the set of operations further includes based on a determination that the featureset is within a predetermined threshold distance from an identified featureset from among the one or more featuresets: selecting a template associated with identified featureset, the template including a definition of at least one key and at least one position; using the selected template to identify key-value pairs within the structured data file; and automatically generating an output file in a common data file structure from information in the structured data file based, at least in part, on positions of the key-value pairs within the structured data file, the common data file structure being different from the first data file structure.

In some embodiments, the template associated with the identified featureset is identified, at least in part, by being associated with a cluster of structured data files, the identified featureset being associated with one of the structured data files included in the cluster.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 8 illustrates an example method of using a data extractor to analyze a structured data file, in accordance with an example embodiment.

DETAILED DESCRIPTION

Figure 1:
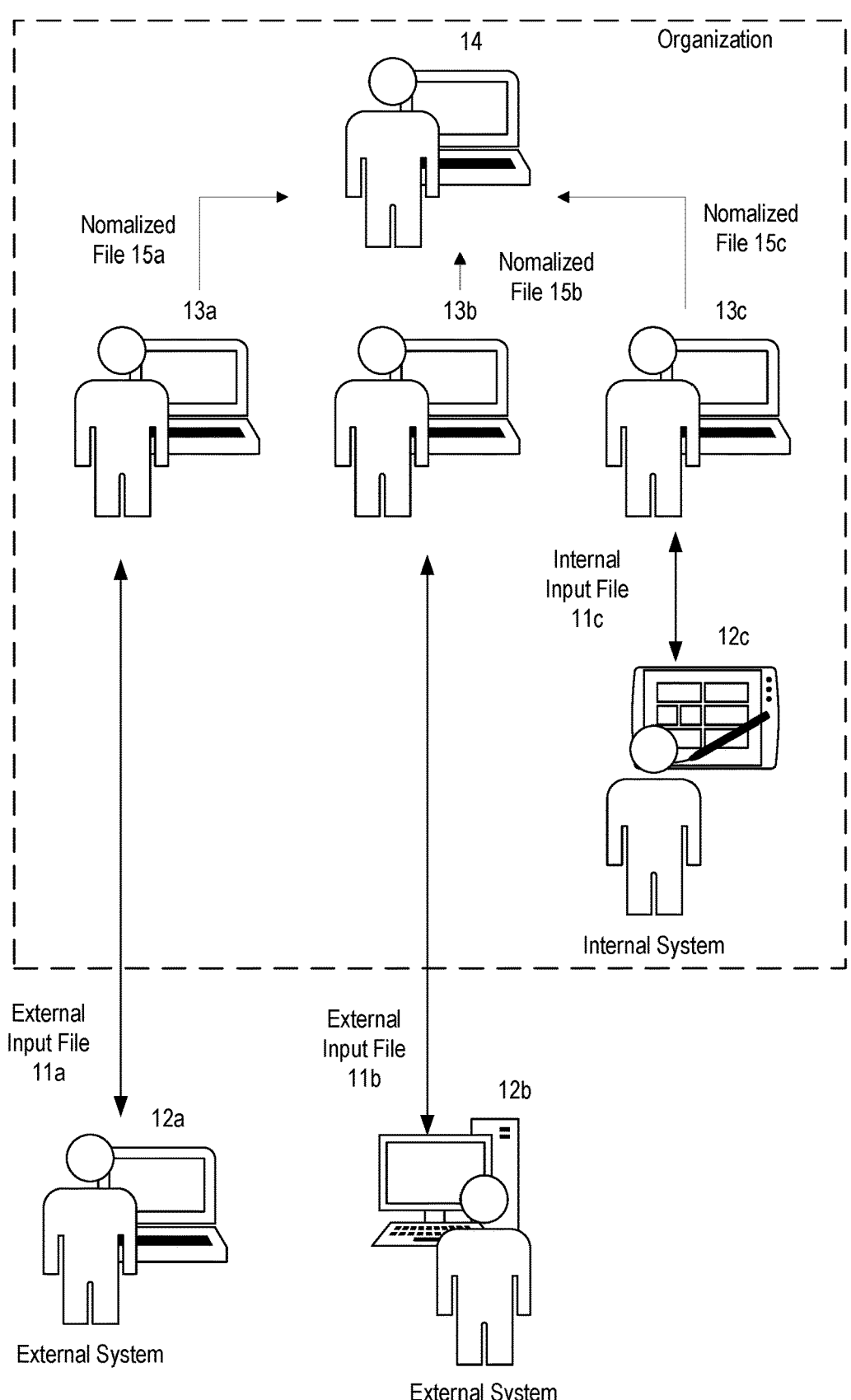
FIG. 1 is a schematic of a structured data processing procedure of the prior art to which exemplary embodiments may be applied.

In accordance with aspects of the present disclosure, methods and systems for extracting relevant data from structured data files are provided. Such structured data files may be received from a plurality of different entities that utilize different or changing data layouts or appearances. Therefore, existing automation tools that rely on specific data being positioned at specific locations within received files are inadequate.

A user of an organization may also need to extract information from multiple structured data files. Such structured data files may come from different file sources or may be modified over time, and thus the data in such structured data files may need to be updated. In some examples, the location of the information in the file may not be affected by such modifications (e.g., weekly modifications of the quantity or price of items). In some examples, different users of the same data may have their own ways of recording information so that the information fits into different locations (different columns/rows) of the file. Methods and systems for automatic extraction of structured data files are provided. Such automated extraction may be based on modeled visual similarity of the structured data files, and may use modeling techniques that are accommodating of inexact matches in location within such structured data files. For example, changes in position within a spreadsheet, in terms of the numbered row or column in which data appears, may be accommodated via a general visual similarity analysis process and use of templates for feature extraction that allow for variances in received structured data files.

In example practical implementations, an application plugin may be implemented and may be configured to interface with a server system that performs visual similarity analysis. The application plugin allows for user interaction with structured data files in a way that provides feedback to modeling systems that determine visual similarity and positions of relevant data within such structured data files. A modeling and clustering process allows for commonalities to be assessed among such files, and templates may be selected to assist with data extraction. Extracted data may then be provided or reconfigured into a standardized format usable by the organization.

The term "user" in the present disclosure may relate to a user of the data extractor who acts as an editor of structured data. Such a user may have access rights to certain ones of the user interfaces described herein.

The term "key-value pair" refers to a primary data representation unit with a key and a value, in which the key describes or identifies the value. Each key-value pair contains a key and a value, such as (key1, value1), (key2, value2), and (key3, value3). For example, the structured data file has one or more keys such as "Item", "Price", and "Cost", and corresponding values such as "item 1", "19", and "17". The key-value pair herein may include (item, item1), (price, 19), and (cost, 17). In some embodiments, one or more keys can be associated with a time value. For example, the structured data file has keys for a specified temporal period (e.g., keys can be based only on the most recent values). In some embodiments, one or more values can be represented as a continuous value (e.g., 270), as a categorical value (e.g., "hair care" or "skin care"), as a textual value, or as any other type of value. In some embodiments, one or more values can be stored as classified weighted values. For example, a sales revenue of $73 can be represented as weighted values of {0.73 10000}.

FIG. 1 is a schematic of a structured data processing procedure of the prior art to which exemplary embodiments may be applied. In FIG. 1, multiple external data sources 12a-b and internal data sources 12c are sharing structured data with an organization in the form of external structured data files 11a-b and internal structured data file 11c. Generally, structured data files 11a-c have different formats and contents, so multiple individuals 13a-c in the organization must manually normalize the structured data upon receipt of these structured data files 11a-c to facilitate further file processing. For example, the normalized output files 15a-c can be centralized to a supervisor 14 for examination, summarization, and aggregation into a uniform format for data analysis. Or an organization or department has individuals 13a-c who receive data from external entities and other departments in different layouts of structured data. The individuals 13a-c may use an application for inspection of data and manual extraction of the data for storage in a common data format, e.g., into a common database. For example, the storage of purchase data, where invoices in different formats are received from vendors for processing, but need to be aggregated in a common format for analysis by the organization or department. In organizations that need to handle large amounts of data, such as retailers, multinational groups, and multi-departmental collaborative organizations, such structured data processing steps are labor-intensive and error prone.

Figure 2:
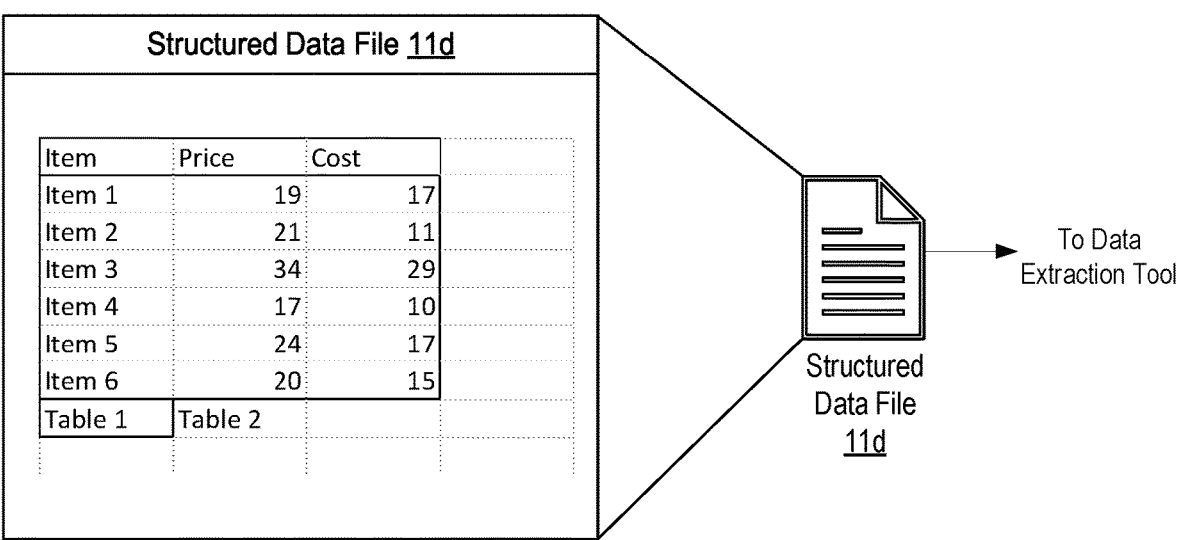
FIG. 2-4 illustrates an example architecture of a data extractor, according to an example embodiment, which may be applied to the organization shown in FIG. 1.
Figure 3:
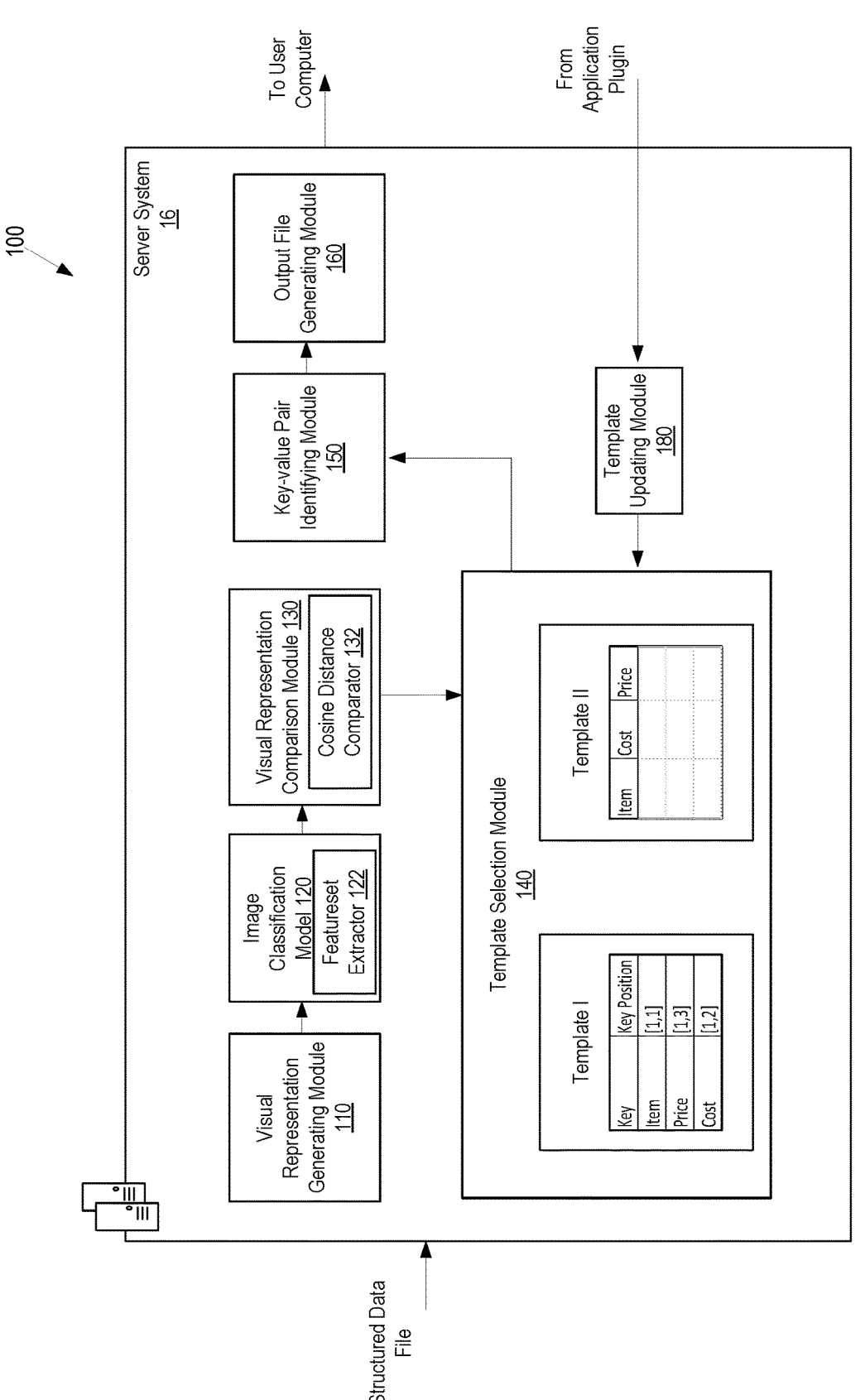
Figure 4:
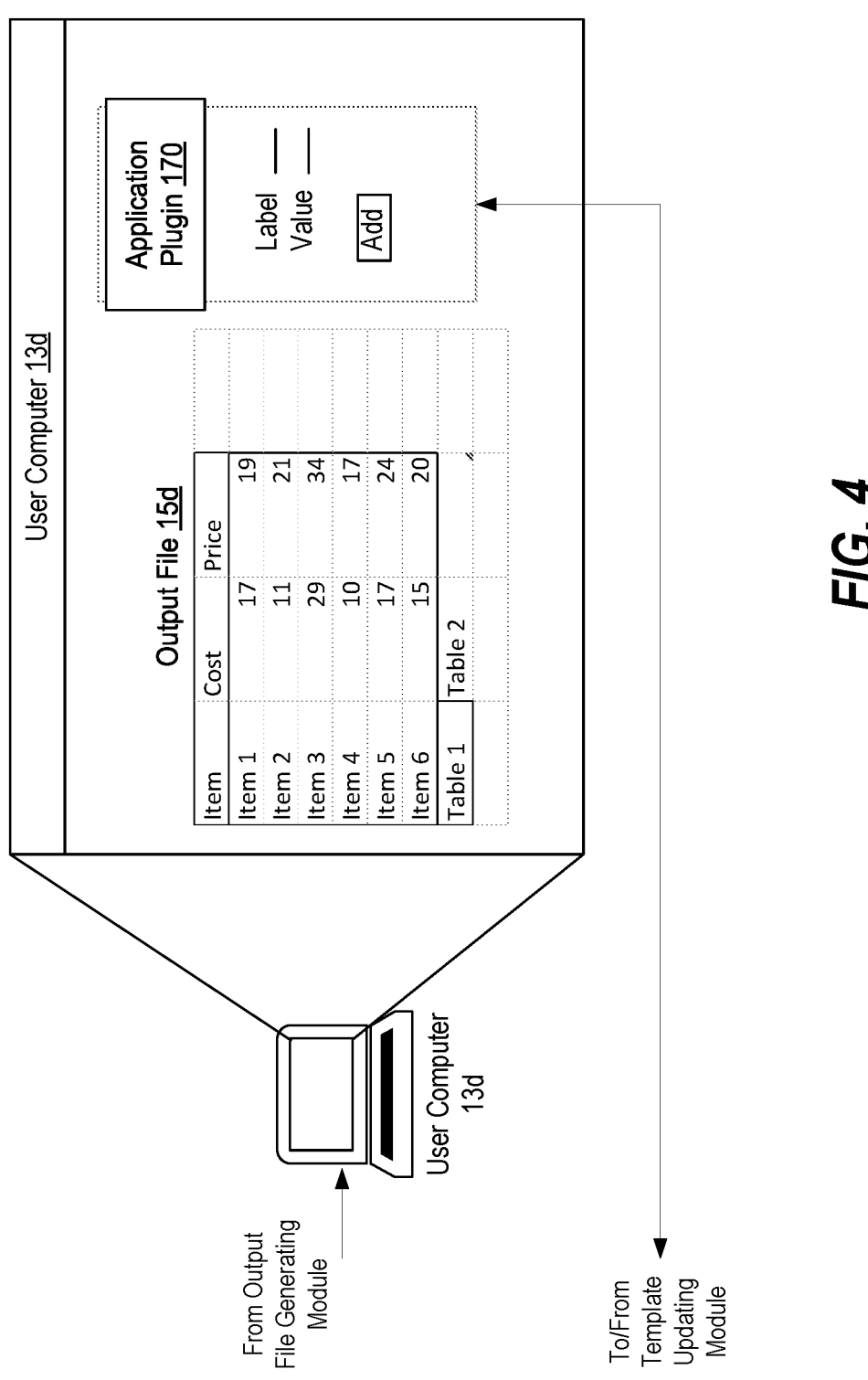

FIGS. 2-4 illustrate an example architecture of a data extractor system 200, according to an example embodiment, which may be applied to the organization shown in FIG. 1. The data extractor system 200 of the present application may be implemented using a data extraction tool, which may be implemented at least in part within a software application, plugin, or the like. The data extractor system 200 also may be implemented at least in part on a computing system 100 as illustrated in FIG. 1. The computing system 100 can therefore include a server system 16 including a visual representation generating module 110, an image classification model 120, a visual representation comparison module 130, a template selection module 140, a key-value pair identifying module 150, and an output file generating module 160.

In some embodiments, the computing system 100 of the organization may receive the first structured data file 11d from external data sources 12a-b, from internal data sources 12c, or from both internal and external data sources 12a-c. In example embodiments, such as seen in FIG. 2, the first structured data file 11d includes key-value pairs or other formats suitable for extraction by a computer. In example embodiments, keys in the first structured data file 11d includes "Item", "Price", and "Cost". In example embodiments, the first structured data file 11d includes multiple tables, for example, "Table 1", and "Table 2".

When such a structured data file 11d is received at the data extractor system 200, in some embodiments, the visual representation generating module 110 may generate a visual representation of the first structured data file 11d which may be received from external data sources 12a-b or internal data sources 12c. In some embodiments, the visual representation generating module 110 may generate at least one of the following: a visual representation of the first structured data file 11d; a visual representation of at least one table of the first structured data file 11d; a visual representation of at least one key-value pair of the first structured data file 11d; and a visual representation of at least one parameter associated with the first structured data file 11d. The visual representation generated by the visual representation generating module 110 has a format that is capable of ingestion by the image classification model 120. In examples, the format may include image formats, such as JPEG, PNG, BMP, GIF, and TIFF. The visual representation of the structured data file is generated in an image file format selected from among a JPEG image format, a PNG image format, a BMP image format, a GIF image format, and a TIFF image format. In some embodiments, the visual representation generating module 110 may perform a further action based upon the visual representation, such as a calculation or a modification of the visual representation.

In some embodiments, the image classification model 120 is configured to extract a featureset including a plurality of features from the visual representation which may be generated by the visual representation generating module 110. In some embodiments, the image classification model 120 classifies the visual representation according to the global feature, the local feature of the local critical area and the correlation feature. In an example image classification model, an image (e.g., a visual representation of the first structured data file 11*d*) can be given. A machine learning algorithm may be applied to classify the image as belonging to a particular class (e.g., 'cost-price images'). Note that the set of classes (e.g., cost-price, price-sale, or item-storage) may be defined a priori. In conclusion, the image classification model 120 may improve the classification capability, ensure the accuracy of classification, facilitate the subsequent operation of the computing system 100, and provide a good basis for visual representation comparisons. In some embodiments, the featureset extractor 122 of the image classification model 120 may use deep learning processing to extract a featureset from the visual representation. In some embodiments, the image classification model 120 may comprise a pretrained image classification model. For example, a deep convolutional neural network trained on a large set of training data may be used to extract a featureset from the visual representation of the first structured data file 11*d*. In example embodiments, the open-source PyPI packages, such as PyTorch or Numpy, were used to extract a featureset from the visual representation that was fed further down for visual representation comparison.

In some embodiments, the visual representation comparison module 130 is configured to compare the featureset of the visual representation to one or more featuresets associated with other structured data files based, at least in part, on a cosine distance between the featureset and each of the one or more featuresets. In some embodiments, the visual representation comparison module 130 may compare the featureset of the visual representation of a first structured data file (e.g., a latest received structured data file) to the featureset associated with the visual representation of a second structured data file (e.g., a previously received structured data file or a reference structured data file). In example embodiments, the visual representation comparison module 130 may compare the visual representation of the first structured data file 11*d* to the visual representation of the sample file. Each visual representation of the sample file corresponds to one or more templates. The sample files may include a plurality of files that have formed correspondence with the plurality of templates pre-stored in the template selection module 140. In addition, the sample file may be a previously received structured data file for which a corresponding template has been previously identified, and the visual representation of the sample file may be the visual representation of a previously received structured data file for which a corresponding template has been previously identified. All these steps can be done automatically in the computing system. In some embodiments, the visual representation comparison module 130 may determine whether the featureset is within a predetermined threshold distance. For example, if a distance between the featureset of the visual representation of a first structured data file and the featureset associated with the visual representation of a second structured data file is within a predefined threshold, the visual representation comparison module 130 may determine that the first structured data and the second structured data belong to the same cluster; if a distance between the featureset of the visual representation of a first structured data file and the featureset associated with the visual representation of a second structured data file exceeds a predefined threshold, the visual representation comparison module 130 may determine that the first structured data and the second structured data do not belong to the same cluster. The detailed explanation of the clustering method will be illustrated later. In some embodiments, the distance between the featureset of the visual representation of a first structured data file and the featureset associated with the visual representation of a second structured data file is determined by the cosine distance. In some embodiments, when a cosine distance comparator 132 determines that the cosine distance between the featureset and each of the one or more featuresets is less than a predetermined threshold, the visual representation comparison module 130 may determine that the first structured data file and the second structured data file belong to the same cluster; when a cosine distance comparator 132 determines that the cosine distance between the featureset and each of the one or more featuresets is greater than or equal to a predetermined threshold, the visual representation comparison module 130 may determine the first structured data file and the second structured data file do not belong to the same cluster. By comparing the featureset of the visual representation of the first structured data file with the featureset associated with the visual representation of the second structured data file, the visual representation comparison module may compare the structured data file based on the location of the data for subsequent processing, such as clustering structured data files that have a similar appearance with respect to the location of the data.

A person skilled in the art may obtain the first preset threshold by means of tests. For example, using distance metrics to compare visual representations in feature vectors (e.g., cosine distance, Euclidean distance, Manhattan distance, Minkowski distance, Mahalanobis distance), the feature vector closest to the submitted feature vector may be identified, and the visual representation corresponding to that feature vector may be determined to be a "match." Once visual representations have been obtained, nearest-neighbor or model-based matching algorithms such as support-vector ranking may be used for visual representation comparison. In each case, a distance metric (e.g., cosine distance or Euclidean distance) can be chosen to measure the similarity between two visual representations.

In some embodiments, previously received structured data files that were not identified as containing the same or similar visual representation as any of the images classified in the cluster may be re-analyzed using the newly received structured data file, the visual representation of the newly received structured data file, or both. For example, the visual representation of a previously received structured data may has been determined to be dissimilar from any image included within a training data set of a visual representation comparison module 130. However, after the visual representation of a newly received structured data file is added to the training data set, such as when it is determined that the visual representation of a newly received structured data file "matches" another visual representation within the cluster, the visual representation of a newly received structured data file may be further compared to the visual representation of the previously received structured data file.

Figure 6:
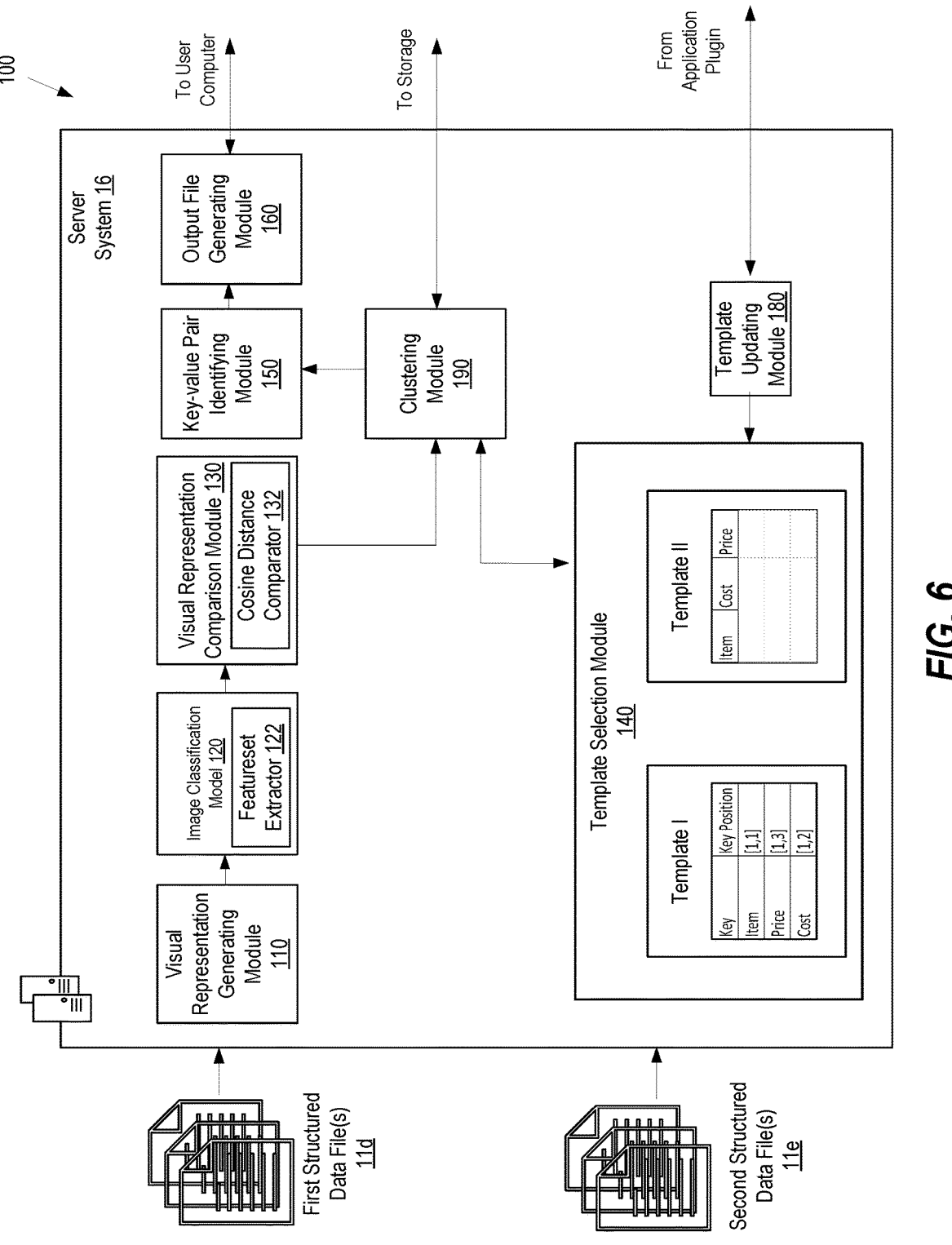

In some embodiments, the template selection module 140 is configured to select, based on a determination that the featureset is within a predetermined threshold distance from an identified featureset from among the one or more featuresets, a template associated with identified featureset, and the template including a definition of at least one key and at least one position. In some embodiments, a determination that the featureset is within a predetermined threshold distance from an identified featureset from among the one or more featuresets is performed by the visual representation comparison module 130, as described above. In some embodiments, the template selection module 140 selects a template associated with identified featureset, and the identified featureset is determined by the comparison of the featureset of the visual representation to one or more featuresets associated with other structured data files. In some embodiments, the selected template includes a definition of at least one key and at least one position. The key may identify, for example, one or more words, letters and/or numbers. The key may identify, for example, a target data element for a given data segment, which may include an indication as to whether a selection was to be made. In some embodiments, the position corresponds to the key, and indicates where the key is to be stored or presented. In some embodiments, the selected template includes part or all of a key and part or all of the position corresponding to the key. In some embodiments, the selected template may also define key-value positions and/or key sizes. In some embodiments, a definition of at least one key and at least one position may be associated with a particular template ID referencing the template selected by the template selection module 140. For example, a template ID may be "Template I" or "Template II", as shown in FIGS. 3 and 6.

In some embodiments, a definition of at least one key and at least one position may be the coordinates of the key in a two-dimensional coordinate system. By setting the origin on the visual representation, we can get the position of the corresponding key from the definition which is included in the template. One of these examples is shown in "Template I". Here, the position of the key "Item" may be defined as [1,1], the position of the key "Price" may be defined as [1,3], and the position of the key "Cost" may be defined as [1,2]. In some embodiments, a definition of at least one key and at least one position may be shown in a structured data format. One of these examples is shown in "Template II". Here, the positions of the key "Item", key "Cost", and key "Price" are predefined in a structured data format.

In some embodiments, the key-value pair identifying module 150 is configured to use the selected template to identify key-value pairs within the structured data file. Because the selected template includes a definition of at least one key and at least one position, the key-value pairs associated with the definition will be identified. For example, after "Template II" is selected by the template selection module 140, the key-value pairs within the first structured data file 11*d* associated with the key "Item", key "Cost", and key "Price" may be identified. In some embodiments, a language model utilized by a machine learning algorithm may capture variations in the keys. For example, variations such as "Product Name" and "Name of Product" as keys for a name may be captured and determined as variations for the same key in different structured data files. Since many forms may provide such fields in the same regions, or substantially the same regions (i.e., less than a predetermined threshold value in distances between locations in different forms), in different forms, the system may store such location information, along with information regarding variations of the key text, for future file processing. In example embodiments, the open-source PyPI packages, such as Pandas and Xlrd, are combined to scope out the key-value pair in the key-value pair identifying module 150. In example embodiments, the open-source PyPI packages, such as Fuzzywuzzy and Regex, are used in parts of the problem statement that require text similarity to be taken into consideration, such as handling cells with Excel formulas or conditions, output formatting, etc.

Figure 7:
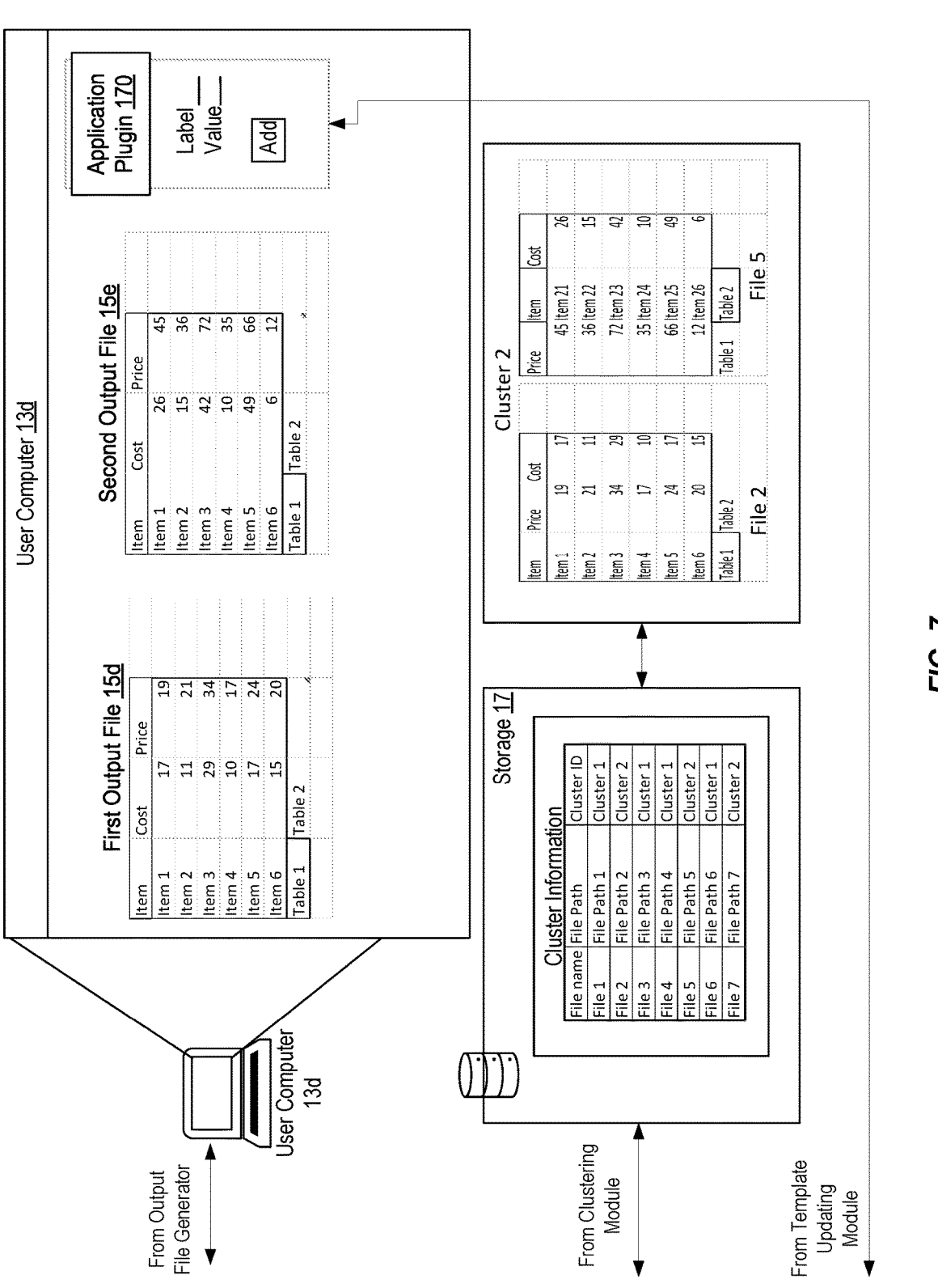

In some embodiments, the output file generating module 160 is configured to automatically generate an output file in a common data file structure from information in the structured data file based, at least in part, on the positions of the key-value pairs within the structured data file, the common data file structure is different from the first data file structure. For example, an output file 15*d* on user computer 13*d* is shown in FIGS. 4 and 7, the output file 15*d* in a common data file structure may be generated from information in the first structured data file 11*d*, and the common data file structure is different from the first data file structure. In some embodiments, as the selected template includes a definition of at least one key and at least one position, an output file 15*d* in a common data file structure may be generated based on both the definition of the selected template, such as the at least one key and the at least one position, and the positions of the key-value pairs within the first structured data file 11*d*. In some embodiments, a plurality of key-value pairs may be cropped out from the first structured data file 11*d*, based on a template. For example, using key-value pairs to enclose relevant data in forms may advantageously reduce the number of computations required to delineate the relevant data from other data in the first structured data file 11*d*, thereby conserving system resources such as memory and processing resources, as well as substantially reducing the time that may be required to process the structured data. In example embodiments, a user computer 13*d* and a server system 16 are different computing systems. In yet another example, the user computer 13*d* and the server system 16 may be implemented by the same one or more computing systems. In an organization, for example, the user computer 13*d* and the server system 16 may share at least one processor and at least one memory.

In another embodiment, the computing system 100 may further include an application plugin 170 and/or a template updating module 180. In another embodiment, the application plugin 170 may be installable at a user device, the application plugin 170 may be communicatively connected to the server system 16 via an Application Programming Interface (API). The components that make up the template include the nodes which are the entities in the template. They can hold any number of key-value pairs, also referred to as properties. Nodes can be tagged with labels, representing their different roles in a particular domain. Node labels may also serve to indicate features specific to certain nodes. In some embodiments, the labelled nodes can include the key value feature pairs and the record label (e.g., whether the entity took the specified action).

In another embodiment, an application plugin 170 is configured to receive a definition of one or more field labels and values. The definition may be generated or sent from the user computer 13*d*, or from any input device that can receive user commands. For example, the organization's staff or operator may add one or more field labels and values to the application plugin 170 via user input or user selection from a user device, and the definitions of the one or more field labels and values are generated by it. In another embodiment, the application plugin 170 or the template updating module 180 is configured to generate one or more key-value pairs associated with positions within the first structured data file 11*d* from the one or more field labels and values. In another embodiment, the application plugin 170 or the template updating module 180 is configured to add the one or more key-value pairs to the key-value pairs associated with the structured data file. In another embodiment, a template updating module 180 is configured to update the selected template based, at least in part, on the one or more added key-value pairs. The updated selected template may be received by the template selection module 140. In some embodiments, an application plugin 170 automatically labels the template with a first label, wherein the first label corresponds to the keys or the key-value pairs. The module also modifies the first label to a second label, and parses the at least one input file in accordance with the second label. This labeling and modification of the generated template enable a better definition of the data to be extracted, either manually by the user or automatically through machine learning algorithms. If the labeling and modification of the generated template are manually performed by the user, then modifying the first label to a second label further includes displaying the first label to a user. The computing system further receives a user input, wherein the user input indicates the second label, and the first label can be adjusted based on the user input.

In another embodiment, the computing system 100 may automatically prompt a user within an application plugin 170 to select the template based on the determination that the featureset is within a predetermined threshold distance from an identified featureset from among the one or more featuresets. By providing users with access to select or update templates via an application plugin, the system is able to improve the adaptability of templates to structured data files, which in turn improves the ability to automate the processing of structured data file.

In another embodiment, the computing system 100 further comprises a database for storing at least one of the featureset including a plurality of features, the structured data file, and the output file, the database being communicatively connected to the server system. In another embodiment, the computing system 100 further comprising a storage 17 for storing cluster information, the database being communicatively connected to the server system. By providing the database or storage for the computing system 100, centralized processing of the structured data files can be achieved.

In some embodiments, a computing system 100 may comprise a server system 16 including a processor and a memory coupled to the processor. In various examples, the memory stores instructions that, when executed by the processor, perform a set of operations. In examples, the set of operations includes receiving, at an organization, a first structured data file 11d in a first data file structure; generating a visual representation of the first structured data file 11d; extracting a featureset including a plurality of features from the visual representation via an image classification model 120; comparing the featureset of the visual representation to one or more featuresets associated with other structured data files based, at least in part, on a cosine distance between the featureset and each of the one or more featuresets; based on a determination that the featureset is within a predetermined threshold distance from an identified featureset from among the one or more featuresets, selecting a template associated with identified featureset, the template including a definition of at least one key and at least one position; using the selected template to identify key-value pairs within the first structured data file 11d; and automatically generating an output file 15d in a common data file structure from information in the first structured data file 11d based, at least in part, on positions of the key-value pairs within the first structured data file 11d, the common data file structure being different from the first data file structure.

It is noted that the computing system 100 described herein have a number of advantages over existing systems with respect to structured data extracting. For example, the use of the present architecture allows for structured data to be extracted significantly faster over very large data (billions of records) using the architecture described above, especially through the detection of cognitive templates based on the comparison of visual representations rather than fixed templates fixed by cell and title names. Moreover, the similarity of files can be determined based on attribute identification rather than a model of exact keys, thus works better for variations. In addition, data extraction can be location agnostic, that is, the data can be extracted by not binding pixel or cell addresses working on static templates, but by associating data extraction with visual representations of the whole structured data file or portions thereof. Still further, the spreadsheet plugin described herein, which includes a guided menu for user customization, improves efficiency in both the creation and distribution of data extractor, and the customized plugin enables easy template creation. Still further, the various customized fields, labels, and key-value pairs described herein may be performed without underlying adjustments to underling data, which makes those operations significantly less time consuming for experienced users while also allowing inexperienced users to readily modify analyses without requiring those users to have familiarity with data structure modification techniques. Other improvements are apparently presented as well, as illustrated in the present disclosure.

Figure 5:
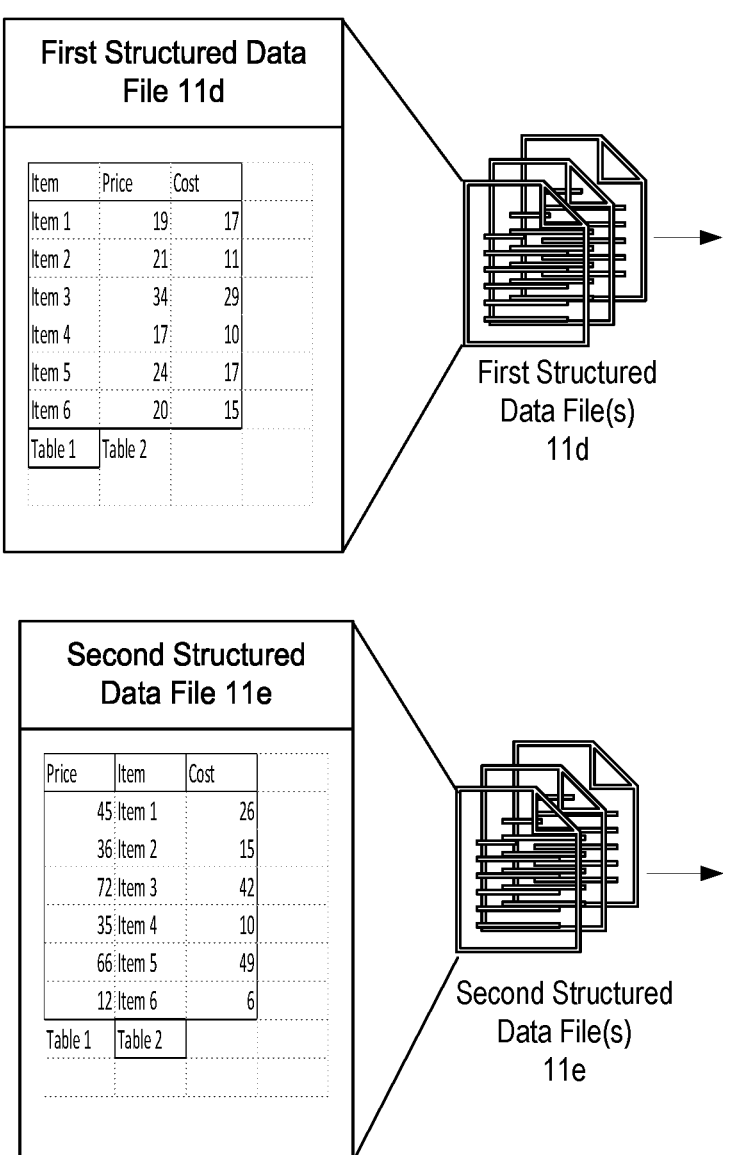
FIG. 5-7 illustrates another example architecture of a data extractor, according to an example embodiment, which may be applied to the organization shown in FIG. 1.

FIGS. 5-7 illustrate another example architecture of a data extractor, according to an example embodiment, which may be applied to the organization shown in FIG. 1. In the embodiment shown, a computing system 100 is connected to a plurality of external data sources 12a-b and internal data sources 12c. The external data sources 12a-b include external systems belonging to third-party vendors, customers, service providers, etc., that are not part of the same organization as the extractor, and internal data sources include internal systems operating within the organization. In some embodiments, the computing system 100 of the organization may further receive a second structured data file 11e in a second data file structure. The second structured data file 11e may be received from external data sources 12a-b, from internal data sources 12c, or from both internal and external data sources 12a-c. The second structured data file 11e includes structured data and may have a different layout than the first structured data file 11d. The second structured data file 11e may have the same layout as the first structured data file 11d. In some embodiments, the visual representation comparison module 130 may generate a second visual representation of the second structured data file 11e. In some embodiments, the featureset extractor 122 may extract a second featureset including a plurality of features from the second visual representation via the image classification model 120. In some embodiments, the visual representation comparison module 130 may compare the second featureset of the second visual representation to one or more featuresets associated with other structured data files based, at least in part, on a cosine distance between the second featureset and each of the one or more featuresets, the cosine distance between the second featureset and each of the one or more featuresets are determined by a cosine distance comparator 132. In some embodiments, an application plugin 170 may prompt a user, based on a determination that the second featureset is outside of the predetermined threshold distance from any of the one or more featuresets, to define one or more field labels and values associated with the second structured data file 11*e*. In some embodiments, an application plugin 170 or the template updating module 180 may generate one or more key-value pairs associated with positions within the second structured data file 11*e* from the one or more field labels and values associated with the second structured data file 11*e*. In some embodiments, the template updating module 180 may create a second template based, at least in part, on keys and associated positions from among the one or more key-value pairs associated with the second structured data file 11*e*.

In some embodiments, the output file generating module 160 is configured to automatically generate a second output file 15*e* in the common data file structure from information in the second structured data file 11*e* based, at least in part, on positions of the key-value pairs within the second structured data file 11*e*, the common data file structure being different from the second structured data file 11*e*.

The computing system 100 may further include a cluster module 190. The cluster module 190 may receive cluster information stored in a computer accessible data storage 17. In some embodiments, cluster information may include file names of structured data files, file paths of structured data files, and Cluster ID. For example, file 1, file 3, file 4, and file 6 in FIG. 7 all belong to a cluster having a Cluster ID, and the Cluster ID here is Cluster 1. For example, file 2, file 5, and file 7 in FIG. 7 all belong to a cluster having a Cluster ID, and the Cluster ID here is Cluster 2. The file path may include storage positions of visual presentations of structured data files, and/or file positions of structured data files.

Generally, in FIG. 7, files such as file 2 and file 5 of Cluster 2 (files in Cluster 1 are not shown), may have imprecisely similar data locations and imprecisely similar visual representations due to the data collection policies of multiple entities or different preferences of the users, but may still belong to the same Cluster. That is, the files in Cluster 2 may have featuresets that are within a predetermined threshold distance from the featureset of reference file(s) or pre-clustered file(s). In addition, the cosine distance between the featureset extracted by the featureset extractor 122 and the featureset of reference file(s) or pre-clustered file(s) of all or some of the clusters may be compared by the cosine distance comparator 132 to determine if the structured data file is within a predetermined distance. For example, if the cosine distance between the featureset of file 7 (here, may be structured data file 11*e*) and the featureset of pre-clustered files, such as file 1, file 3, file 4, and/or file 6 in cluster 1, is calculated to exceed a threshold distance, the clustering module 190 may decide that file 7 does not belong to cluster 1. And, the cosine distance between the featureset of file 7 (here, may be structured data file 11*e*) and the featureset of pre-clustered files, such as file 2 (here, may be structured data file 11*d*) and/or file 5 in cluster 1, is calculated and within threshold distance, the clustering module 190 may decide that file 7 belong to cluster 2. By comparing the visual representation of file 7 with visual representations of files in different clusters, the system 100 can match data locations that do not precisely match due to the visual representation being imprecisely similar, and the clustering module 190 cluster file 7 based on the data location of file 7 and the data location of files in one or more clusters, thus the template(s) associate with the cluster may be targeted. The above comparisons and clustering may be processed one by one or simultaneously.

In some embodiments, the computing system 100 may further add the second structured image to a new cluster within a plurality of clusters of images, each cluster of images being associated with a different template. Each cluster may include several images and/or files, and associate with a template. In some embodiments, a similarity measure (e.g., a cosine distance) between the first structured image and the second structured image may be computed and, if the similarity satisfies a threshold similarity condition (e.g., the cosine distance is less than a threshold distance), the second structured image may be added to the cluster with the first structured image. In this way, the clusters may expand even without having to receive input images, but instead by obtaining a "bridge" image that bridges two otherwise "different" input images.

In some embodiments, the computing system 100 may further add the first structured data file 11*d* to a cluster of structured data files associated with the template, based on the determination that the featureset is within a predetermined threshold distance from an identified featureset from among the one or more featuresets. For example, a cluster module 190 may determine the featureset similarity between an unassigned first structured data file 11*d* and one or more structured data file clusters already assigned to one or more templates, by determining that the featureset is within a predetermined threshold distance from an identified featureset from among the one or more featuresets. By comparing the featuresets of the first structured data file 11*d* to one or more featuresets of one or more clusters of structured data files, the most relevant cluster may be identified for the structured data file 11*d*, and thus the most relevant template may be found for the automatic processing of the structured data file 11*d*.

In some embodiments, prior to receiving the structured data file, a clustering module 190 may cluster the other structured data files based on visual similarity, and associate templates with each corresponding cluster of structured data files. The other structured data files may include structured data files previously received from external data sources 12*a-b* or internal data sources 12*c*. The other structured data files may also include training-related data stored in the computer accessible data storage 17 of the computing system 100 is determined responsive to data received over the network from the training station. By training the clustering module 190 with previously received structured data files or training data files, the clustering module 190 enables better selection of appropriate clusters based on the data or the visual representation of the current structured data file, which in turn improves the accuracy of template selection.

In some embodiments, a clustering module 190 may perform a k-means clustering of the other structured data files based, at least in part, on cosine distance calculations between pairs of featuresets from among the one or more featuresets. In some embodiments, the clustering of the other structured data files comprises k-means clustering of the other structured data files into a predetermined number of clusters (e.g., between 2 and 50 clusters). In some embodiments, the clustering of the other structured data files comprises k-means clustering of the other structured data files into a number of clusters, where the number of clusters is provided by the organization. In some embodiments, the goal of k-means clustering is to cluster the other structured data files based on the cosine distance calculations between pairs of featuresets from among the one or more featuresets into K partitions. In some embodiments, K is a number between 2 and 50 inclusive. In some embodiments, the number K is set to a predetermined number such as 10. In some embodiments, the number K is optimized for particular other structured data files. In some embodiments, the staff or the operation of the organization sets the number K.

In some embodiments, the template associated with the identified featureset is identified, at least in part, by being associated with a cluster of structured data files, the identified featureset being associated with one of the structured data files included in the cluster. By further associating a template with a cluster of structured data files, fine-grained template processing for different clusters can be implemented.

FIG. 8 illustrates an example method of using a data extractor to analyze structured data file 11*d*, in accordance with an example embodiment. In some embodiments, the method includes receiving, at an organization, a first structured data file 11*d* in a first data file structure (step 802); generating a visual representation of the first structured data file 11*d* (step 804); extracting a featureset including a plurality of features from the visual representation via an image classification model 120 (step 806); comparing the featureset of the visual representation to one or more featuresets associated with other structured data files based, at least in part, on a cosine distance between the featureset and each of the one or more featuresets (step 808); based on a determination that the featureset is within a predetermined threshold distance from an identified featureset from among the one or more featuresets, selecting a template associated with identified featureset, the template including a definition of at least one key and at least one position (step 810); using the selected template to identify key-value pairs within the first structured data file 11*d* (step 812); and automatically generating an output file 15*d* in a common data file structure from information in the first structured data file 11*d* based, at least in part, on positions of the key-value pairs within the first structured data file 11*d*, the common data file structure being different from the first data file structure (step 814). It is noted that the method described herein have a number of advantages over existing methods with respect to structured data extracting. For example, the use of the present operations allows for structured data to be extracted significantly faster over very large data (billions of records) using the architecture described above.

In some embodiments, a computer-readable storage medium may comprise computer-executable instructions which, when executed, cause a computing system to perform a set of operations. In examples, the set of operations includes receiving, at an organization, a first structured data file 11*d* in a first data file structure; generating a visual representation of the first structured data file 11*d*; extracting a featureset including a plurality of features from the visual representation via an image classification model 120; comparing the featureset of the visual representation to one or more featuresets associated with other structured data files based, at least in part, on a cosine distance between the featureset and each of the one or more featuresets. In some embodiments, the set of operations further includes based on a determination that the featureset is outside of a predetermined threshold distance from any of the one or more featuresets: prompting a user, via an application plugin, to define one or more field labels and values associated with the structured data file; generating, from the one or more field labels and values associated with the structured data file, one or more key-value pairs associated with positions within the structured data file; creating a template based, at least in part, on the one or more key-value pairs associated with positions within the second structured data file. In some embodiments, the set of operations further includes based on a determination that the featureset is within a predetermined threshold distance from an identified featureset from among the one or more featuresets: selecting a template associated with identified featureset, the template including a definition of at least one key and at least one position; using the selected template to identify key-value pairs within the structured data file; and automatically generating an output file in a common data file structure from information in the structured data file based, at least in part, on positions of the key-value pairs within the structured data file, the common data file structure being different from the first data file structure. It is noted that the method described herein have a number of advantages over existing methods with respect to structured data extracting. For example, the use of the present operations allows for structured data to be extracted significantly faster over very large data (billions of records) using the architecture described above.

Figure 9:
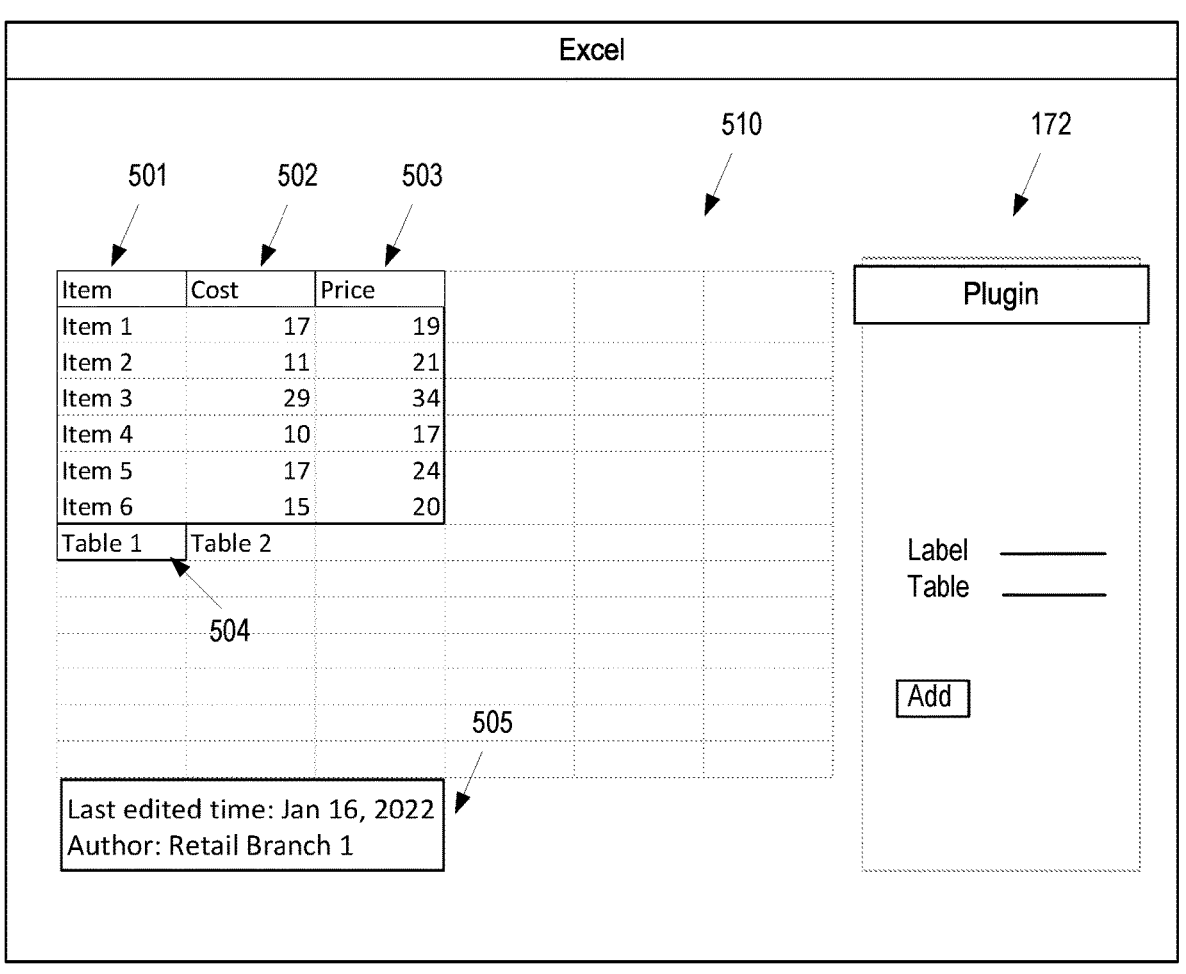
FIG. 9 illustrates an example user interface of a data extractor that includes a structured data region and a plugin in which a label or a value may be defined for extraction of structured data, according to an example embodiment.
Figure 10:
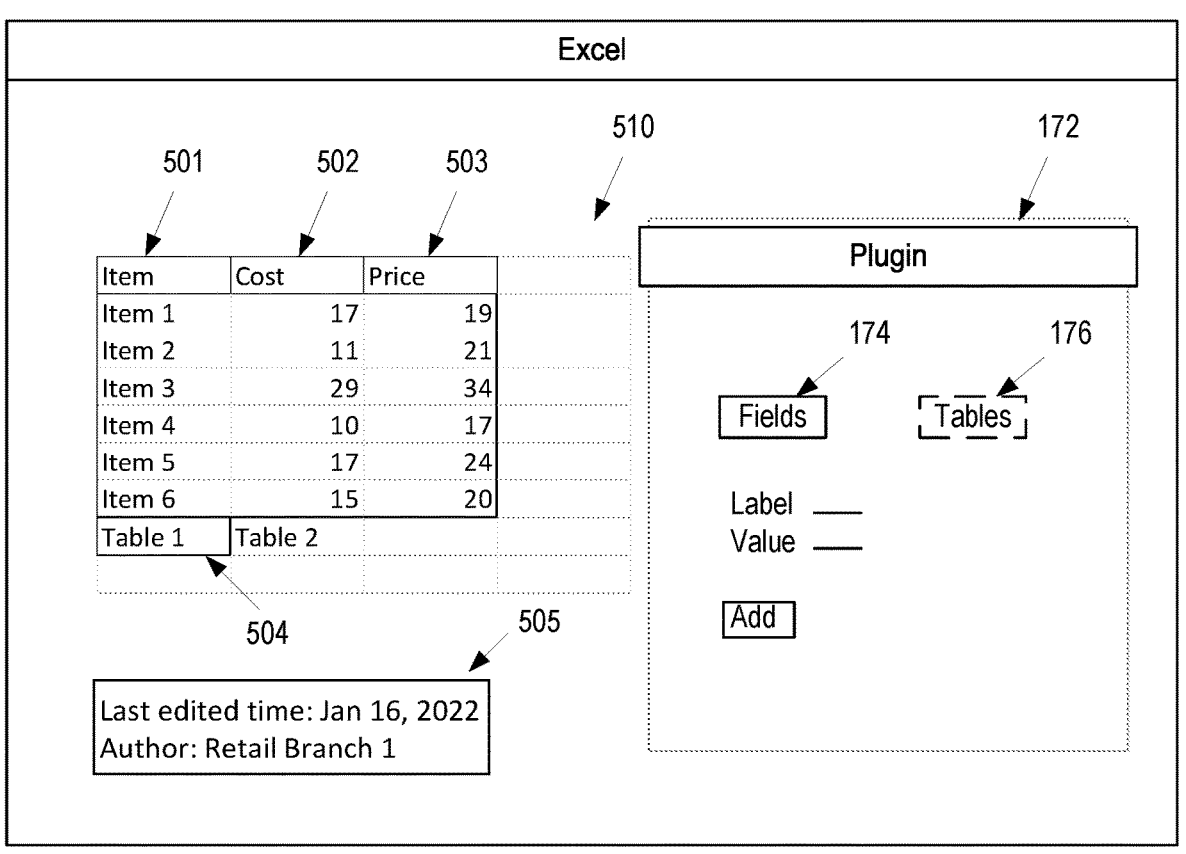
FIG. 10 illustrates another example user interface of a data extractor that includes a structured data region and a plugin in which a field may be defined for extraction of structured data, according to an example embodiment.
Figure 11:
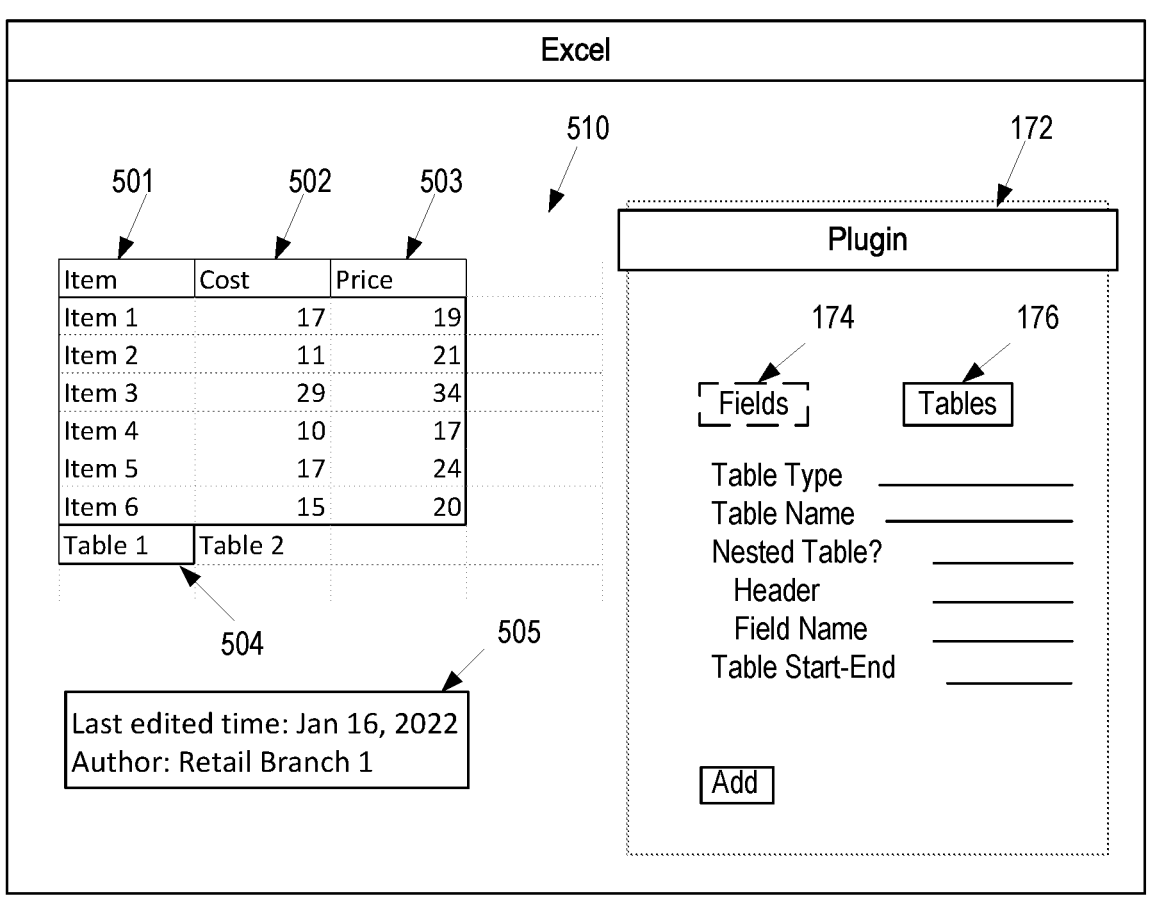
FIG. 11 illustrates another example user interface of a data extractor that includes a structured data region and a plugin in which a table may be defined for extraction of structured data, according to an example embodiment.

The data extractor may be presented to the user within a user interface, for example as seen in FIGS. 9-11. The user interface of the data extractor provides the base user interface where a user can manage functional component user interactions, settings, and policies. Each user interface can provide a display to the user to present that functional client module's user interface. Accordingly, the user interface of the data extractor may include a data region user interface 510, and one or more plugin user interface 172. As an example, FIGS. 9-11 each show two user interfaces. This architecture allows the user interface of the data extractor to show user Interface elements specific for the data region 500 and the application plugin 170. FIG. 9-11 illustrate example user interfaces of a data extractor which includes a data region 500 and an application plugin 170, according to an example embodiment. The data region 500 includes a plurality of structured and unstructured regions, including structure data regions 501, 502, 503, a table selection region 504, and a file details region 505. Generally, a user wishes to define one or more fields, labels or values within the data region 500 (in which several fields are currently shown, as well as a file details region). In some embodiments, only structured data region 501, 502, and 503 will be extracted. In some embodiments, both structured data region 501, 502, and 503 and table selection region 504 will be extracted. In some embodiments, all of the structured data region 501, 502, and 503, table selection region 504, and file details region 505 will be extracted.

FIG. 9 illustrates an example user interface of a data extractor which includes a data region 500 and an application plugin 170, according to an example embodiment. In FIG. 9, a label and a table may be defined for the extraction of structured data. In another embodiment, the application plugin 170 includes a plugin user interface 172 accessible from the user device, the user interface 172 is configured to define one or more field labels and values associated with the structured data file. Defining a label type, a label name, a label range, a label location, a table type, a table name, a table range, and a table location requires a user to select each of the selectable options, or manually enter the options. By setting multiple label/value options, the user may define position agnostic, floating key location, or excel like formulas on extracted data. Similarity based key extraction, multi-sheet extraction, or rules-based extraction may also be performed by the label/value options. By setting multiple table options, the user may extract data from the full table or some selected columns, from floating table(s), from nested table(s), from horizontal and normal table(s), from table(s) with calculated headers and values, from identify end of the table(s), or from hidden columns of the table(s).

FIGS. 10-11 illustrates example user interfaces of a data extractor that include a data region 500 and an application plugin 170 in which fields and tables may be defined for the extraction of structured data, according to an example embodiment. In another embodiment, the user interface includes a plurality user-selectable interface elements including at least one of the following: a fields tab and a tables tab. As seen in FIG. 10, and seen in the further version of the user interface shown in FIG. 11, the plugin user interface 172 includes a fields tab 174 and a tables tab 176. The fields tab 174 defines the field information required to generate or update a template. In another embodiment, defining a label type, a label name, a label range, a label location, a value type, a value name, a value range, or a value location requires a user to select each of the selectable options, or manually enter the options. By setting multiple label/value options, the user may define position agnostic, floating key location, or excel like formulas on extracted data. Similarity based key extraction, multi-sheet extraction, or rules-based extraction may also be performed by the label/value options. The tables tab 176 defines the table information required to generate or update a template. In another embodiment, defining a table type, a table name, a table start-end or whether it is a nested table requires a user to select each of the selectable options, or manually enter the options. By setting multiple table options, the user may extract data from the full table or some selected columns, from floating table(s), from nested table(s), from horizontal and normal table(s), from table(s) with calculated headers and values, from identify end of the table(s), or from hidden columns of the table(s). In another embodiment, the user interface is configured to display the selected template. By displaying the selected template to the user, the selectable options can be better located and more accurate updates can be made to the selected template.

Figure 12:
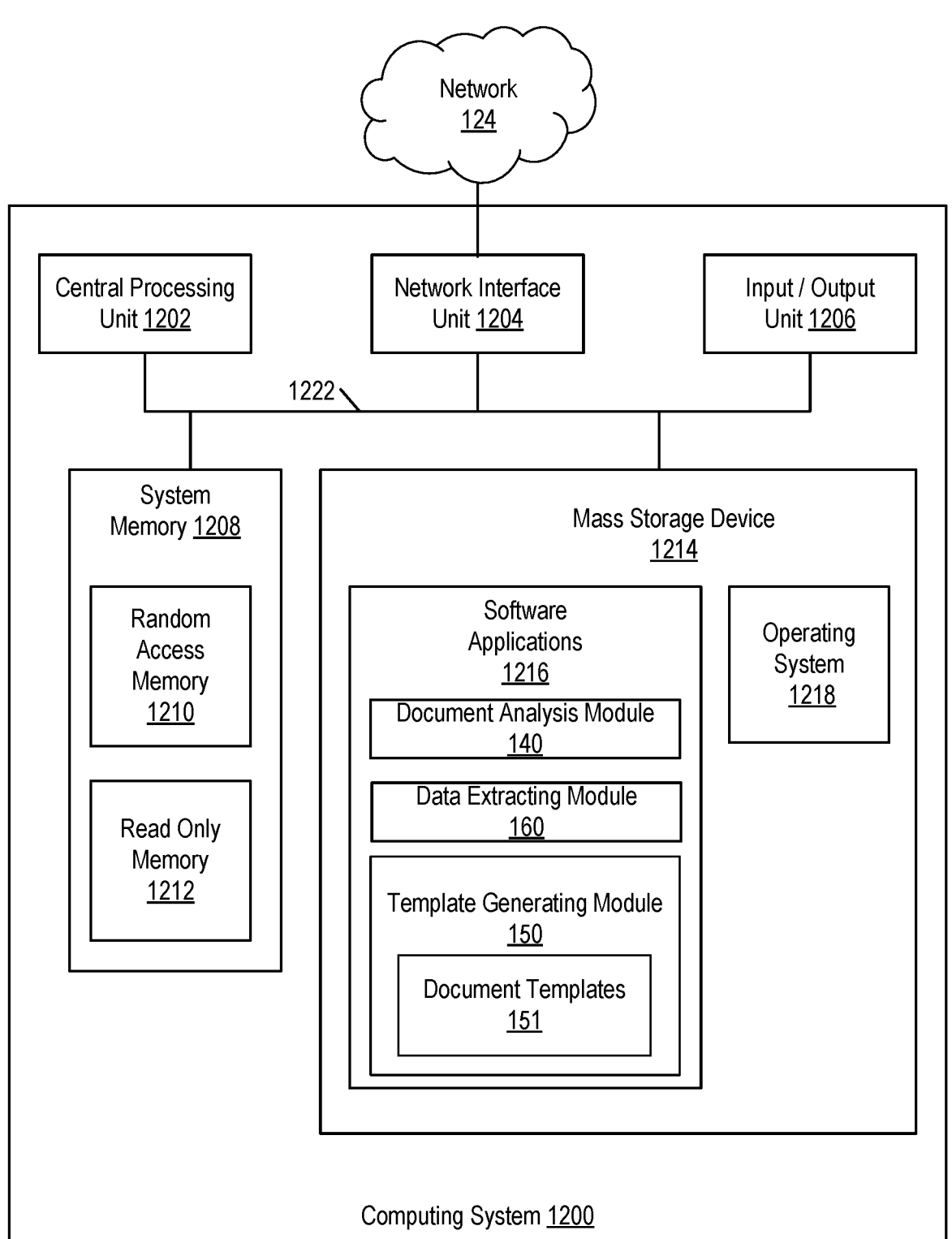
FIG. 12 illustrates an example computing device with which aspects of the present disclosure may be implemented.

FIG. 12 illustrates an example system 1200 with which disclosed systems and methods can be used. In an example, the system 1200 can include a computing environment. The computing environment can be a physical computing environment, a virtualized computing environment, or a combination thereof. The computing environment can include memory 1208, a communication medium 1222, one or more processing units 1202, a network interface 1204, an input/output unit 1206, and a mass storage device 1214.

The memory 1208 can include a computer readable storage medium. The computer storage medium can be a device or article of manufacture that stores data and/or computer-executable instructions. The memory 1208 can include volatile and nonvolatile, transitory and non-transitory, removable and non-removable devices or articles of manufacture implemented in any method or technology for storage of information, such as computer readable instructions, data structures, program modules, or other data.

By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1208 can store various types of data and software. For example, as illustrated, the memory 1208 includes random access memory 1210 and read only memory for implementing one or more aspects of the data extractor described herein, as well as other database. In some examples the memory 1220 can include instructions for generating a template for extraction of organizational data.

The communication medium 1222 can facilitate communication among the components of the computing environment. In an example, the communication medium 1222 can facilitate communication among the memory 1208, the one or more processing units 1202, the network interface 1204, an input/output unit 1206, and a mass storage device 1214. The communications medium 1222 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1202 can include physical or virtual units that selectively execute software instructions. In an example, the one or more processing units 1202 can be physical products comprising one or more integrated circuits. The one or more processing units 1202 can be implemented as one or more processing cores. In another example, one or more processing units 1202 are implemented as one or more separate microprocessors. In yet another example embodiment, the one or more processing units 1202 can include an application-specific integrated circuit (ASIC) that provides specific functionality. In yet another example, the one or more processing units 1202 provide specific functionality by using an ASIC and by executing computer-executable instructions.

The network interface unit 1204 enables the computing environment to send and receive data from a communication network (e.g., network 1224). The network interface unit 1204 can be implemented as an Ethernet interface, a token-ring network interface, a fiber optic network interface, a wireless network interface (e.g., WI-FI), or another type of network interface.

The input/output unit 1206 enables the computing environment to communicate with external devices. For example, the input/output unit 1206 can be a USB interface, Thunderbolt interface, a Lightning interface, a serial port interface, a parallel port interface, a PS/2 interface, and/or another type of interface that enables the computing environment to communicate with external devices. In various embodiments, the input/output unit 1206 enables the computing environment to communicate with various external components, such as external storage devices, input devices, speakers, modems, media player docks, other computing devices, scanners, digital cameras, and fingerprint readers.

Although illustrated as being components of a single computing environment, the components of the computing environment 1200 can be spread across multiple computing environments. For example, one or more of instructions or data stored on the memory 1208 may be stored partially or entirely in a separate computing environment that is accessed over a network.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method for extracting structured data from a structured data file, the method comprising:

clustering, by a clustering module, stored structured data files based on visual similarity of visual representations of the stored structured data files, wherein the visual similarity includes a location of data in the visual representation associated with each file in the stored structed data files;

after clustering the stored structured data files, associating templates with one or more corresponding clusters of structured data files;

receiving, at an organization, a structured data file in a first data file structure, the structured data file including one or more tables;

generating a visual representation of the structured data file, wherein the visual representation is an image file representative of an appearance of a layout and arrangement of the one or more tables within the structured data file;

extracting, by a featureset extractor, a featureset including a plurality of features from the visual representation via an image classification model in order to classify the visual representation, as belonging to a particular class;

comparing, by a visual representation comparison module, the featureset of the visual representation to one or more featuresets extracted from one or more other visual representations of structured data files based, at least in part, on a cosine distance between the featureset and each of the one or more featuresets, wherein the cosine distance measures a visual similarity between two visual representations in order to identify a group of one or more structured data files having an appearance similar to the layout and arrangement of the one or more tables within the structured data file;

based on a determination that the featureset is within a predetermined threshold distance from an identified featureset from among the one or more featuresets, selecting a template associated with the identified featureset, wherein the template associated with the identified featureset is identified, at least in part, by being associated with a cluster of structured data files, the identified featureset being associated with one of the structured data files included in the cluster and the template including a definition of at least one key and at least one position of data within the one or more tables, wherein the at least one key identifies a target data element for a particular data segment;

using the selected template to identify key-value pairs within the structured data file; and automatically generating an output file in a common data file structure from information in the structured data file based, at least in part, on positions of the key-value pairs within the structured data file, the common data file structure being different from the first data file structure.

2. The method of claim 1, further comprising:

receiving, at an application plugin, a definition of one or more field labels and values;

generating, from the one or more field labels and values, one or more key-value pairs associated with positions within the structured data file;

adding the one or more key-value pairs to the key-value pairs associated with the structured data file; and updating the selected template based, at least in part, on the one or more added key-value pairs.

3. The method of claim 1, further comprising:

receiving, at the organization, a second structured data file in a second data file structure;

generating a second visual representation of the second structured data file;

extracting a second featureset including a plurality of features from the second visual representation via the image classification model;

comparing the second featureset of the second visual representation to one or more featuresets associated with other structured data files based, at least in part, on a cosine distance between the second featureset and each of the one or more featuresets;

based on a determination that the second featureset is outside of the predetermined threshold distance from any of the one or more featuresets, prompting a user, via an application plugin, to define one or more field labels and values associated with the second structured data file;

generating, from the one or more field labels and values associated with the second structured data file, one or more key-value pairs associated with positions within the second structured data file; and creating a second template based, at least in part, on keys and associated positions from among the one or more key-value pairs associated with the second structured data file.

4. The method of claim 3, further comprising automatically generating a second output file in the common data file structure from information in the second structured data file based, at least in part, on positions of the key-value pairs within the second structured data file, the common data file structure being different from the second data file structure.

5. The method of claim 3, further comprising adding the second visual representation to a new cluster within a plurality of clusters of images, each cluster of images being associated with a different template.

6. The method of claim 1, further comprising, based on the determination that the featureset is within a predetermined threshold distance from an identified featureset from among the one or more featuresets, automatically prompting a user within an application plugin to select the template.

7. The method of claim 1, wherein the visual representation of the structured data file is generated in an image file format selected from among:

a JPEG image format;

a PNG image format;

a BMP image format;

a GIF image format; and a TIFF image format.

8. The method of claim 1, further comprising, based on the determination that the featureset is within a predetermined threshold distance from an identified featureset from among the one or more featuresets, adding the structured data file to the cluster of structured data files associated with the template.

9. The method of claim 1, wherein clustering the stored structured data files includes performing a k-means clustering of the stored structured data files based, at least in part, on cosine distance calculations between pairs of featuresets from among featuresets extracted from the visual representations of the stored structured data files.

10. The method of claim 1, wherein the image classification model comprises a pretrained image classification model.

11. A system comprising:

a server system including a processor and a memory, the memory storing instructions which, when executed, cause the server system to perform:

clustering, by a clustering module, stored structured data files based on visual similarity of visual representations of the stored structured data files, wherein the visual similarity includes a location of data in the visual representation associated with each file in the stored structed data files;

after clustering the stored structured data files, associating templates with one or more corresponding clusters of structured data files;

receiving, at an organization, a structured data file in a first data file structure, the structured data file including one or more tables;

generating a visual representation of the structured data file, wherein the visual representation is an image file representative of an appearance of a layout and arrangement of the one or more tables within the structured data file;

extracting, by a featureset extractor, a featureset including a plurality of features from the visual representation via an image classification model in order to classify the visual representation as belonging to a particular class;

comparing, by a visual representation comparison module, the featureset of the visual representation to one or more featuresets extracted from one or more other visual representations of structured data files based, at least in part, on a cosine distance between the featureset and each of the one or more featuresets, wherein the cosine distance measures a visual similarity between two visual representations in order to identify a group of one or more structured data files having an appearance similar to the layout and arrangement of the one or more tables within the structured data file;

based on a determination that the featureset is within a predetermined threshold distance from an identified featureset from among the one or more featuresets, selecting a template associated with the identified featureset, wherein the template associated with the identified featureset is identified, at least in part, by being associated with a cluster of structured data files, the identified featureset being associated with one of the structured data files included in the cluster and the template including a definition of at least one key and at least one position of data within the one or more tables, wherein the at least one key identifies a target data element for a particular data segment;

using the selected template to identify key-value pairs within the structured data file; and automatically generating an output file in a common data file structure from information in the structured data file based, at least in part, on positions of the key-value pairs within the structured data file, the common data file structure being different from the first data file structure.

12. The system of claim 11, further comprising an application plugin installable at a user device, the application plugin being communicatively connected to the server system via an Application Programming Interface (API).

13. The system of claim 12, wherein the application plugin includes a user interface accessible from the user device, the user interface being configured to define one or more field labels and values associated with the structured data file.

14. The system of claim 13, wherein the user interface includes a plurality of user-selectable interface elements including at least one of the following: a fields tab and a tables tab.

15. The system of claim 13, wherein the user interface is configured to display the selected template.

16. The system of claim 11, further comprising a database for storing at least one of the featureset including a plurality of features, the structured data file, and the output file, the database being communicatively connected to the server system.

17. The system of claim 11, further comprising a database for storing cluster information, the database being communicatively connected to the server system.

18. A non-transitory computer-readable storage medium comprising computer-executable instructions which, when executed, cause a computing system to perform:

clustering, by a clustering module, stored structured data files based on visual similarity of visual representations of the stored structured data files, wherein the visual similarity includes a location of data in the visual representation associated with each file in the stored structed data files;

after clustering the stored structured data files, associating templates with one or more corresponding clusters of structured data files;

receiving, at an organization, a structured data file in a first data file structure, the structured data file including one or more tables;

generating a visual representation of the structured data file, wherein the visual representation is an image file representative of an appearance of a layout and arrangement of the one or more tables within the structured data file;

extracting, by a featureset extractor, a featureset including a plurality of features from the visual representation via an image classification model in order to classify the visual representation, as belonging to a particular class;

comparing, by a visual representation comparison module, the featureset of the visual representation to one or more featuresets associated with one or more other visual representations of structured data files based, at least in part, on a cosine distance between the featureset and each of the one or more featuresets, wherein the cosine distance measures a visual similarity between two visual representations in order to identify a group of one or more structured data files having an appearance similar to the layout and arrangement of the one or more tables within the structured data file;

based on a determination that the featureset is outside of a predetermined threshold distance from any of the one or more featuresets:

prompting a user, via an application plugin, to define one or more field labels and values associated with the structured data file;

generating, from the one or more field labels and values associated with the structured data file, one or more key-value pairs associated with positions within the structured data file;

creating a template based, at least in part, on the one or more key-value pairs associated with positions within the structured data file;

based on a determination that the featureset is within a predetermined threshold distance from an identified featureset from among the one or more featuresets:

selecting a template associated with the identified featureset, wherein the template associated with the identified featureset is identified, at least in part, by being associated with a cluster of structured data files, the identified featureset being associated with one of the structured data files included in the cluster and the template including a definition of at least one key and at least one position of data within the one or more tables, wherein the at least one key identifies a target data element for a particular data segment;

using the selected template to identify key-value pairs within the structured data file; and automatically generating an output file in a common data file structure from information in the structured data file based, at least in part, on positions of the key-value pairs within the structured data file, the common data file structure being different from the first data file structure.

* * * * *